United States Patent [19]

Harrison

[11] Patent Number: 5,266,300
[45] Date of Patent: Nov. 30, 1993

[54] METHOD OF MAKING POROUS ALUMINA

[75] Inventor: Jeffrey B. Harrison, Fishkill, N.Y.

[73] Assignee: Texaco Inc., White Plains, N.Y.

[21] Appl. No.: 388,411

[22] Filed: Aug. 2, 1989

[51] Int. Cl.$^5$ .................. C01F 7/02; B01J 23/00
[52] U.S. Cl. .................. 423/628; 423/625; 502/322; 502/335
[58] Field of Search ............ 502/322, 439, 335; 208/216 PP, 251 H; 423/628, 625

[56] References Cited

U.S. PATENT DOCUMENTS

| | | | |
|---|---|---|---|
| 3,630,888 | 12/1971 | Alpert et al. | 502/254 |
| 4,048,295 | 9/1977 | Wasserman et al. | 423/628 |
| 4,082,695 | 4/1978 | Rosinski et al. | 502/220 |
| 4,089,774 | 5/1978 | Oleck et al. | 208/89 |
| 4,225,421 | 9/1980 | Hensley, Jr. et al. | 208/216 PP |
| 4,297,242 | 10/1981 | Hensley, Jr. et al. | 502/220 |
| 4,301,037 | 11/1981 | Sanchez et al. | 502/527 |
| 4,306,965 | 12/1981 | Hensley, Jr. et al. | 208/216 PP |
| 4,309,278 | 1/1982 | Sawyer | 208/111 |
| 4,328,127 | 5/1982 | Angevine et al. | 502/219 |
| 4,395,328 | 7/1983 | Hensley, Jr. et al. | 208/251 H |
| 4,499,203 | 2/1985 | Toulhoat et al. | 502/322 |
| 4,657,665 | 4/1987 | Beaton et al. | 208/216 R |
| 4,789,462 | 12/1988 | Byrne et al. | 208/216 PP |

FOREIGN PATENT DOCUMENTS

| | | | |
|---|---|---|---|
| 0243894 | 11/1987 | European Pat. Off. | 502/439 |
| 0137800 | 9/1979 | Fed. Rep. of Germany | 423/628 |

*Primary Examiner*—Gary P. Straub
*Assistant Examiner*—Steven Bos
*Attorney, Agent, or Firm*—James J. O'Loughlin; Carl G. Seutter

[57] ABSTRACT

Hydrodesulfurization and demetallalization of hydrocarbon charge is effected by hydrogenation in the presence of, as catalyst, a Group VI A metal and a non-noble Group VIII metal on a trimodal alumina support. The alumina support is formed by mixing at least two different finely divided charge aluminas each of which has a different pore mode.

5 Claims, No Drawings

METHOD OF MAKING POROUS ALUMINA

FIELD OF THE INVENTION

This invention relates to a novel process for converting heavy hydrocarbons to lighter hydrocarbons. More particularly it relates to removal of sulfur and contaminant metals from heavy hydrocarbons during hydrocarbon conversion and to a catalyst system.

BACKGROUND OF THE INVENTION

Economic considerations dictate that heavy oils or residua obtained during petroleum refining be upgraded to distillate fractions of higher economic value. It is desirable to convert bitumen or heavy crude oils to synthetic crude oils of lower boiling point so that they may be processed in conventional downstream operations. This may be carried out by hydrogenation of these materials at high temperature and high pressure. Typically this is carried out in an ebullated bed wherein the upflowing liquid charge contacts the catalyst which may be present in the form of extrudates of diameter of 0.7–1.6 mm.

Those skilled in the art have attempted to improve the catalyst systems used in the various processes for hydrogenation of heavy oils. Typical of prior art attempts to develop improved catalysts may be noted the following:

U.S. Pat. No. 4,657,665 discloses a catalyst of high macroporosity. The Total Pore Volume (TPV) is 0.85–1.5 cc/g; 0.15–0.40 cc/g of the Total Pore Volume is contained within pores having a diameter of 1200A or greater. The final composition contains VI B metal (as oxide) in amount of 3.5%–5%.

U.S. Pat. No. 4,395,328 discloses a catalyst wherein at least 0.8 cc/g of the TPV is contained within pores having a diameter of 0–120A and at least 0.1 cc/g is contained within pores having a diameter of 1200–50,000A.

U.S. Pat. No. 4,328,127 discloses a catalyst in which 40%–75% of the TPV is contained within pores having a diameter of 150A–200A and up to 5% of the TPV is contained within pores having a diameter greater than 1000A.

U.S. Pat. No. 4,309,278 discloses a catalyst in which not more than 0.2 cc/g of the TPV is contained in pores of diameter greater than 400A.

U.S. Pat. No. 4,306,965 discloses a catalyst characterized by pore volume, surface area, and pore diameter.

U.S. Pat. No. 4,297,242 discloses a catalyst wherein at least 95% of the TPV is contained in pores having a diameter less than 130A.

U.S. Pat. No. 4,225,421 discloses a catalyst wherein 3–30% of the TPV is contained in pores having a diameter greater than 600A.

U.S. Pat. No. 4,089,774 discloses a catalyst wherein at least 45% of the TPV is contained in pores having a diameter of 30–150A and at least 10% of TPV is contained in pores having a diameter of at least 300A.

U.S. Pat. No. 4,082,695 discloses a catalyst wherein at least 5% of the TPV is contained in pores having a diameter of at least 500A.

U.S. Pat. No. 3,630,888 discloses a catalyst wherein 20%–80% of the TPV is contained in pores of diameter less than 100A, 10%–40% of the TPV is contained in pores of 100A–1000A, and 10%–40% of TPV is contained in pores of diameter greater than 1000A.

It is an object of this invention to provide a catalyst of improved properties. Other objects will be apparent to those skilled in the art.

STATEMENT OF THE INVENTION

In accordance with certain of its aspects, this invention is directed to a composition comprising a porous alumina body having a Total Pore Volume of about 0.65–1.30 cc/g, about 2–20% of the Total Pore Volume being in the form of First Macropores having a Diameter of about 100,000A–10,000A, about 5–30% of the Total Pore Volume being in the form of Second Macropores having a Diameter of about 10,000A–1,000A, and about 50–93% of the Total Pore Volume being in the form of Mesopores having a Pore Diameter of about 1000A–30A.

DESCRIPTION OF THE INVENTION

The porous alumina bodies of this invention are characterized by a trimodal pore distribution and particularly contain two distinct peaks in the macropore region (pores of diameter greater than about 1000A) and a single peak in the mesopore region (about 30A–1000A)—when pore volume (as a percent of Total Pore Volume TPV) is plotted as a function of Pore Diameter A.

The trimodal alumina bodies of this invention are typically characterized as follows:

(i) First Macropores in the 100,000–10,000A region in amount to provide a pore volume of about 0.02–0.15 cc/g corresponding to about 2–20% of the Total Pore Volume. Preferably this First Macropore region will contain pores in the 40,000–20,000A region in amount to provide a pore volume of about 0.04–0.08 cc/g corresponding to about 5–12% of the Total Pore Volume. In the preferred embodiment, the First Macropore region may have a Pore Mode (i.e. the pore size corresponding to the peak maximum when the log differential intrusion cc/g, is plotted as a function of Pore Diameter) of about 60,000–20,000A, preferably 40,000–20,000, say 30,000A in amount to provide a pore volume of about 0.06 cc/g in the 40,000–20,000A region corresponding to about 7% of the Total Pore Volume.

(ii) Second Macropores in the 10,000–1,000A region in amount to provide a pore volume of about 0.05–0.27 cc/g corresponding to about 5–30% of the Total Pore Volume. Preferably this Second Macropore region will contain pores in the 6000–2000A region in amount to provide a pore volume of about 0.1–0.2 cc/g corresponding to about 15–28% of the Total Pore Volume. In the preferred embodiment, the Second Macropore region may have a Pore Mode of about 6000–2000A, preferably 5000–2000A, say 4000A in amount to provide a pore volume of about 0.19 cc/g in the 6000–2000A region corresponding to about 22% of the Total Pore Volume.

(iii) Mesopores in the 1000 30A region in amount to provide a pore volume of about 0.58–0.88 cc/g corresponding to 50–93% of the Total Pore Volume. Preferably this Mesopore region will contain pores in the 130–70 A region in amount to provide a pore volume of about 0.48–0.62 cc/g corresponding to about 60–82% of the Total Pore Volume. In the preferred embodiment, the Mesopore region may have a Pore Mode of 140–80A, preferably 110–120A, say about 110A in amount to provide a pore volume of about 0.60 cc/g in the 140–80A region corresponding to about 71% of the Total Pore Volume.

It will be apparent to those skilled in the art that, when Pore Volume (actually Log Differential Intrusion cc/g) is plotted as a function of Pore Diameter, the curve will be characterized by three peaks. The Mesopore peak may be the highest—indicating that the largest portion of the Pore Volume is contained in the smallest (under 1000A) pores. The First Macropore region and the Second Macropore peaks will typically be lower; and the First Macropore peak will generally be lower than the Second Macropore peak.

It is a characteristic of the trimodal alumina bodies of this invention that if one plots the Cumulative Intrusion cc/g as a function of Pore Diameter, the curve will show three plateaux:

(i) The First Macropore region is characterized by a plateau in the in the 100,000–10,000A region corresponding to about 0.2 cc/g.

(ii) The Second Macropore region is characterized by a plateau in the 10,000–1000A region corresponding to about 0.3–0.5 cc/g.

(iii) The Mesopore region is characterized by a plateau in the 1000–30A region corresponding to about 0.8 cc/g.

The Total Pore Volume TPV of the trimodal alumina bodies may be 0.65–1.3 cc/g, preferably about 0.80–0.90 cc/g, say 0.85 cc/g.

In accordance with certain aspects of this invention, the trimodal alumina body may be formulated by mixing charge aluminas which are characterized by desired properties. Specifically the charge aluminas which may be mixed may be characterized by their desired pore mode.

It may be possible for example to form the trimodal alumina bodies of this invention by mixing:

(i) Three separate monomodal aluminas each of which is characterized by a pore mode of desired value. In this instance for example it may be possible to mix a monomodal alumina having a pore mode of 110A, a monomodal alumina of pore mode of 4000A, and a monomodal alumina of pore mode of 20,000A.

In certain instances, it may be possible to mix more than three monomodal aluminas; in this instance, at least two of the aluminas would be characterized by similar pore modes. This might be effected when the two aluminas of similar pore modes are characterized by other desired properties e.g. surface area, etc.

(ii) One monomodal alumina plus a bimodal alumina. In this instance, the pore mode of the monomodal alumina is different from that of the bimodal alumina—to the end that the product be characterized by a trimodal pore distribution.

Here again it may be possible to employ more than one monomodal alumina and/or more than one bimodal alumina at least some of the aluminas possessing pore modes similar to others—to the end that the product be characterized by a trimodal pore distribution.

The monomodal aluminas may be characterized by an Acid Dispersability of less than about 15%, typically 0–10%, say 3%. Acid Dispersability is measured by centrifuging (1800 rpm/5min) an acidified slurry (250 meq $HNO_3$/100 g $Al_2O_3$), decanting the fraction remaining in suspension, drying the remaining solid at 220° F., calcining at 750° F., and weighing.

(iii) Two different bimodal aluminas which are characterized by one pore mode in common and a second pore mode which is different. For example, one bimodal alumina may be characterized by a Mesopore mode of about 110 and a First Macropore mode of about 30,000A while the second bimodal alumina may be characterized by a Mesopore mode of about 110 and a Second Macropore mode of about 5000A. When admixed, the alumina body may be characterized by a trimodal pore mode.

When the trimodal alumina body is prepared using a bimodal alumina, it should be noted that the bimodal alumina always contributes to the Mesopores and at least one of the First or Second Macropores, preferably the Second Macropores. If the trimodal alumina body is formed by mixing the bimodal alumina with a monomodal alumina, then the latter will provide the First Macropores. If the trimodal alumina body is formed by mixing two bimodal aluminas, each will typically possess mesopores; and one will typically contribute the majority of the First Macropores and the other the majority of the Second Macropores.

It will also be apparent to those skilled in the art that other formulations may be employed. For example, it may be desirable to increase e.g. the peak of the first macropore mode of a trimodal alumina by admixing the trimodal alumina with a monomodal alumina which is characterized by a pore mode which is comparable to the first macropore mode peak of the trimodal alumina.

The alumina which may be charged to form the trimodal product may be any alumina which is suitable for the process in which it is to be used. This may include alpha, delta, gamma, chi, eta, or theta aluminas, pseudo boehmites, boehmites, alumina trihydrates, amorphous aluminas, etc. These charge aluminas may typically be in the form of particles of average particle size of 40A–100 microns.

Illustrative monomodal aluminas which may be employed may include:

TABLE (i) Alpha alumina having a pore mode of about 100,000A, a total pore volume of 0.4 cc/g, a total surface area of 4 $m^2/g$, and an acid dispersability of less than 10%;

(ii) Alpha alumina having a pore mode of 4000A, a total pore volume of 0.6 cc/g, a total surface area of 6 $m^2/g$, an acid dispersability of less than 10%;

(iii) An alumina trihydrate having a pore mode of 110A, a total pore volume of 0.7 cc/g, a total surface area of 254 $m^2/g$, an acid dispersability of 85%;

(iv) Pseudoboehmite alumina having a pore mode of 90A, a total pore volume of 0.72 cc/g, a total surface area of 320 $m^2/g$, an acid dispersability of 75%;

(v) Pseudoboehmite alumina having a pore mode of 70A, a total pore volume of 0.77 cc/g, a total surface area of 350 $m^2/g$, and an acid dispersability of 85%.

Illustrative bimodal aluminas which may be employed may include:

TABLE (i) Pseudoboehmite having a pore mode of 110A and a pore volume of 0.50 cc/g corresponding to 67% of the Total Pore Volume, a pore mode of 4000A, a pore volume of 0.25 cc/g corresponding to 33% of the Total Pore Volume and an Acid Dispersibility of 50%.

(ii) A gamma alumina having a pore mode of 110A a pore volume of 1.05 cc/g corresponding to 75% of the Total Pore Volume, a pore mode of 30,000A, a pore volume of 0.3 cc/g corresponding to 25% of the Total Pore Volume, and an Acid Dispersability of less than 10%.

(iii) A gamma alumina having a pore mode of 90A a pore volume of 0.62 cc/g corresponding to 78% of the Total Pore Volume, a pore mode of 40,000A, a pore volume of 0.18 cc/g corresponding to 22% of the Total Pore Volume, and an Acid Dispersability of less than 10%.

(iv) A pseudoboehmite having a pore mode of 90A, a pore volume of 0.74 cc/g corresponding to 90% of the Total Pore Volume, a pore mode of 3000A, a pore volume of 0.07 cc/g corresponding to 10% of the Total Pore Volume, and an Acid Dispersability of 65%.

In accordance with certain of its aspects, the invention is directed to a method which comprises mixing at least two finely divided charge aluminas each of which is characterized by at least one Pore Mode in at least one of the ranges (i) 100,000A–10,000A (ii) 10,000A–1,000A, or (iii) 1000A–30A the mixture containing a Pore Mode in each of the ranges;

adding to said mixture acidifying liquid in amount of about 90%–110% of the Total Pore Volume of the mixture;

extruding said acidified mixture;
drying said extruded mixture; and
calcining said dried mixture.

When the alumina body of the invention is prepared according to the preferred aspect of this invention, it is preferred to mix an Acid dispersable bimodal pseudoboehmite alumina with a non Acid dispersable bimodal gamma alumina (i.e. less than 10% Acid Dispersibility).

When the alumina body is prepared by mixing two bimodal aluminas, it is preferred that they be of different Acid Dispersability.

The first bimodal alumina preferably has a high acid dispersability i.e. greater than about 10%, typically 10–50%, say about 40%. The second bimodal alumina preferably has a low acid dispersability i.e. less than about 10%, typically 0–10%, say about 3%.

Formulation of the mixture of aluminas to provide the desired trimodal alumina body may be effected by mixing the dry particles of charge aluminas. The amount of each component may readily be calculated from the pore volume distribution of each alumina at each pore mode.

For example, it may be possible to form desired product by mixing (i) 90 parts of bimodal gamma alumina of TPV of 0.87 cc/g, containing Mesopores of pore mode of 110A (pore volume of 0.25 cc/g) of First Macropores of pore mode of 4000A with (ii) 10 parts of monomodal alpha alumina of TPV of 0.50 cc/g containing 100% (pore volume of 0.06 cc/g) of Second Macropores of pore mode of 40,000A.

The mix containing the alumina charge components may be acidified typically with acidifying liquid such as an aqueous solution of an organic acid such as acetic acid, formic acid, propionic acid, oxalic acid, etc. or an inorganic acid such as sulfuric acid, nitric acid, etc. Preferably acetic acid is employed.

The acid solution is employed in amount of 90%–110%, say 100% of the pore volume of the mix. Typically the acid (i.e. the aqueous solution thereof) is added in amount of 0.75–1, say 0.85 cc per gram of mix.

The acidified mixture is then thoroughly mixed and extruded to form catalyst-support extrudate—typically 0.5–5 mm, say 7 mm long cylinders of 0.5 mm diameter. The extrudates may be dried in air at 60° F.–300° F., say 150° F. for 1–24 hours, say 10 hours. Thereafter they may be calcined in air at 550° F. 2000° F., say 750° F. for 1–6 hours, say 3 hours.

Formation of catalyst may be carried out by loading the trimodal alumina support with metals appropriate to the reaction to be carried out. If the catalyst is to be used to hydrogenate heavy oils (typified by the reaction employed in the H-Oil brand process), the catalyst may typically contain a Group VI B metal (chromium Cr, molybdenum Mo, or Tungsten W) and a non-noble Group VIII metal (iron Fe, Cobalt Co, or nickel Ni). The Group VI B metal may be present in amount of 3–24%, preferably 8–12%, say 9.5% of the support. The Group VIII metal may be present in amount of 0.0–7%, preferably 1.2–2.5%, say 1.5% of the support.

One preferred catalyst may contain 9.5 w % of molybdenum and 1.5% nickel.

The support may be loaded with the metals by immersing the support in aqueous ammonium molybdate solution at a pH of 2.0 for 0.5–12 hours, say 3 hours, drying at 60°–300° F., say 80° F. for 1–24 hours, say 10 hours, and calcining at 550°–1100° F., say 930° F. for 1–6 hours, say 3 hours in air. Thereafter the partially loaded support may be immersed in aqueous nickel nitrate solution for 0.5–12 hours, say 3 hours, drying at 60° F.–300° F., say 80° F. for 1–24 hours, say 10 hours and calcining at 550° F.–1100° F., say 750° F. for 1–6 hours, say 3 hours.

It is a feature of this invention that the catalytic metals may be loaded onto the charge aluminas prior to, during, or after mixing. The metals may be loaded separately (as above noted) or simultaneously from a solution containing e.g. nickel nitrate and ammonium molybdate. When the noted metals are added from a single solution, it preferably contains a stabilizer such as hydrogen peroxide, citric acid, or phosphoric acid.

Preferably at least one of the aqueous solutions of the metals may be added during the mixing of the aluminas. When this is done, the quantity of aqueous acid may be decreased or eliminated—subject to the qualification that the total amount of liquid added during mixing is of the same order of magnitude, and preferably equal to, the TPV of the mixture.

It is a feature of the catalysts prepared by use of the trimodal aluminas of this invention that they may be characterized as follows:

(i) First Macropores in the 100,000–10,000A region in amount to provide a pore volume of about 0.03–0.15 cc/g corresponding to about 2–20% of the TPV. Preferably the First Macropore region will contain pores in the 40,000–20,000A region in amount to provide a pore volume of about 0.03–0.08 cc/g corresponding to about 5–10% of the TPV. In the preferred embodiment, the First Macropore region will have a Pore Mode of about 30,000A in amount to provide a pore volume of about 0.06 cc/g corresponding to about 7% of TPV.

It will be noted that the values in the First Macropore region for the catalyst are substantially comparable to the values for the trimodal alumina body.

(ii) Second Macropores in the 10,000–1000A region in amount to provide a pore volume of about 0.05–0.25 cc/g corresponding to about 5–30% of the TPV. Preferably the Second Macropore region will contain pores in the 6000–2000A region in amount to provide a pore volume of about 0.08–20 cc/g corresponding to about 17–25% of the TPV. In the preferred embodiment, the Second Macropore region may have a Pore Mode of about 4000A in amount to provide a pore volume of about 0.17 cc/g corresponding to about 22% of the TPV.

It will be noted that the values in the Second Macropore region for the catalyst are substantially comparable to the values for the trimodal alumina body.

(iii) Mesopores in the 1000A-30A region in amount to provide a Pore Volume of about 0.44-0.66 cc/g corresponding to about 50-93% of TPV. Preferably this Mesopore region will contain pores in the 130-70A region in amount to provide a pore volume of about 0.48-0.62 cc/g corresponding to about 65-78% of the TPV. In the preferred embodiment, the Mesopore region may have a Pore Mode of about 105A-100A in amount to provide a pore volume of about 0.55 cc/g corresponding to about 71% of the TPV.

It will be noted that the values in the Mesopore region for the catalyst are substantially comparable to (although they may be slightly lower than) the values for the trimodal alumina body.

The finished catalyst may have a TPV of 0.6-1.25 cc/g, preferably 0.7-0.9 cc/g, say 0.78 cc/g and a surface area of 120-220 m²/g, preferably 150-200 m²/g, say 180 m²/g.

It is a feature of the trimodal alumina bodies of this invention that the Pore Mode of the Mesopores may be shifted to the left (i.e. enlarged) if desired. This would be desired for example if the final catalyst were to be used in a hydrogenation process (e.g. H-Oil brand of process) to which was to be charged a hydrocarbon feed stock containing a large quantity of larger molecules such as asphaltenes.

The Pore Mode of the Mesopores may be changed by treating the mixed aluminas after mixing and prior to addition of catalyst metals.

In practice of this aspect of the process of this invention, the Pore Mode of the Mespores may be shifted to the left (i.e. enlarged) by heating the mixture of charge aluminas or the trimodal alumina body (prior to addition of catalyst metals) optionally in the presence of water vapor or steam to 700° C.-1000° C., say 900° C. for 1-5 hours, say 3 hours. This may be effected during calcination.

During this operation, the volume distributions in the Macropore region remain largely unchanged. Typically the Mesopore Mode may increase by 5A-50A, preferably 30A-50A, say 40A up to an increased value of 80A-120A, preferably 90A-110A, say 110A. In the preferred embodiment, the Mesopore Mode may increase from an initial value of 80A up to 110A.

It is a feature of the catalysts prepared using the trimodal aluminas of this invention that they may be employed to hydrotreat a heavy hydrocarbon oil to yield a product characterized inter alia by (i) decreased content of heavy metals such as vanadium or nickel and (ii) decreased content of sulfur and (iii) conversion of asphaltenes into hydrogenated products of lower boiling point. The asphaltenes are determined gravimetrically as cyclohexane insolubles by mixing one part of the hydrotreated product with 50 parts of cyclohexane and filtering.

It is these components which undesirably contribute substantially to the coke-forming and sediment-forming propensity of the heavy oils to be treated by the process of this invention.

These heavy oils include typically vacuum residua having a high boiling point (commonly above 1000° F.). Use of the catalyst of the instant invention permits conversion of these heavy oils to lighter products (typically having a boiling pint below 1000° F.) which may be more readily susceptible to distillation in a crude distillation tower or in a vacuum distillation tower.

Hydrocarbon conversion according to the process of this invention includes admitting the charge hydrocarbon at 750° F.-820° F., say 800°-810° F. to an ebullated bed of catalyst. Catalyst is typically a 6.3% molybdenum, 1.2% nickel on trimodal alumina in cylinders 1 mm in diameter and 7 mm long. Hydrogen is admitted to the ebullated bed in amount of 2000-7000 SCFB, say 5000 SCFB at operating pressure of 1500-3000 psig, say 2250 psig. Reactor space velocity for the charge stock is 0.10-0.5, say 0.37 VHSV based on empty reactor.

Product typically recovered in liquid phase at 70°-300° F., say 120° F. and 0-50 psig, say 10 psig is typically found to be characterized by an ibp of 50° F.-200° F., say 120° F., a 50% bp of 750° F.-850° F., say 800° F., and and ep of 900° F.-1050° F., say 1000° F., when the charge is characterized by an ibp of 600° F.-800° F., say 700° F., a 50% by bp of above 1000° F., and an ep of above 1000° F.

DESCRIPTION OF PREFERRED EMBODIMENT

Practice of the process of this invention will be apparent to those skilled-in-the-art from the following wherein all parts are parts by weight unless otherwise set forth. An asterisk indicates a control example.

EXAMPLE I

In this example which represents the best mode presently known of carrying out the process of this invention, the charge aluminas are as follows:

(a) 80 parts of pseudoboehmite—a bimodal alumina of TPV of 0.85 cc/g containing (i) Mesopores of pore mode of 110A corresponding to 67% of TPV of the pseudoboehmite and a pore volume of 0.57 cc/g and (ii) Second Macropores of pore mode of 4000A corresponding to 33% of TPV of the pseudoboehmite and a pore volume of 0.28 cc/g, the pseudoboehmite having an acid Dispersability of 40% and a surface area of 196 m²/g.

(b) 20 parts of gamma alumina—a bimodal alumina of TPV of 1.05 cc/g containing (i) mesopores of pore mode of 110A corresponding to 67% of TPV of the gamma alumina and a pore volume of 0.7 cc/g and (ii) First Macropores of pore mode of 30,000A corresponding to 33% of TPV of the gamma alumina and a pore volume of 0.35 cc/g, this gamma alumina having an Acid Dispersability of less than 5% and a surface area of 170 m²/g.

These aluminas are mixed; and there is added glacial acetic acid in amount of about 2 g per 100 g of alumina. Mixing is effected in a Sigma blade mixer for 30 minutes during which time a paste is formed. The paste is extruded in a piston extruder to form cylinders of 1 mm diameter and 2 mm height. After air-drying at 80° F. for 12 hours, they are calcined at 932° F. for 3 hours.

The so-formed calcined trimodal alumina support is found to be characterized by a pore volume of 0.82 cc/g and a surface area of 178 m²/g. It contains:

(a) First Macropores in the 100,000-10,000A region in amount to provide a pore volume of 0.06 cc/g corresponding to 7% of TPV. Pore mode is about 30,000A.

(b) Second Macropores in the 10,000-1,000A region in amount to provide a pore volume of 0.18 cc/g corresponding to 22% of TPV. Pore Mode is about 4,000A.

(c) Mesopores in the 1000-30A region in amount to provide a pore volume of 0.58 cc/g corresponding to above 71% of TPV. Pore mode is about 110A.

This alumina body is impregnated with 12.5% aqueous ammonium molybdate for 24 hours, dried at 75° F. for 12 hours, and calcined at 932° F. for 3 hours. It is then impregnated with 6.4% aqueous nickel nitrate for 24 hours, dried at 75° F. for 12 hours and calcined at 752° F. for 3 hours.

Catalyst contained 9.53% w MoO₃ and 1.50 w % NiO. TPV is 158 m²/g and pore volume is 0.78 cc/g.

This catalyst was placed in a 300 cc continuous flow Robinson-Mahoney reactor. Presulfiding with carbon disulfide was effected at 600° F. Reaction was carried out at 800° F. (Ex I, II, and IV) and at 800° F. (Ex III). Reaction pressure was 2250 psig. Hydrogen was admitted at 5000 SCFB space velocity. Feed flow rate was 0.034 liters/hour corresponding to a LHSV of 0.37. Catalyst space velocity was 0.96.

Charge and product characteristics were as follows:

TABLE

| Property | Charge | Example I 800° F. Reaction Product @ 0.6 bbl/# |
|---|---|---|
| API Gravity | 5.8 | — |
| 1000° F+ | 93.1 | 43.2 |
| Composition % | | |
| Carbon | 84.29 | 86.27 |
| Hydrogen | 10.09 | 11.21 |
| Nitrogen | 0.52 | 0.45 |
| Sulfur | 3.64 | 1.48 |
| Alcor MCR Carbon Residue w % | 19.86 | 12.70 |
| n-C7 insolubles | 11.97 | 4.9 |
| Metals wppm | | |
| Ni | 52 | 21.0 |
| V | 131 | 24.0 |
| Fe | 11 | 3 |
| Cr | 0.7 | 0 |
| Na | 5.0 | 0 |

EXAMPLES II–IV*

A series of comparative runs was carried out to determine the conversion (w %) of the charge stock of Example I as a function of Catalyst Age (bbl/#). In Experimental Examples II and III, the catalyst was the same as that of Example I. In Control Example IV*, the catalyst was a commercially available HDS catalyst of American Cyanamid Company sold under the trademark HDS-1443B and having the following characteristics:

TABLE

| Composition: | |
|---|---|
| % Mo | 8.80 |
| % Ni | 2.83 |
| % Al₂O₃ | balance |
| Physical Properties | |

TABLE-continued

| Size | 1/32" |
|---|---|
| Surface Area | 318 m²/g |
| Total Pore Volume | 0.77 cc/g |

| Pore Diameter Distribution | | |
|---|---|---|
| A | cc/g | % |
| 30–100 | 0.42 | 54.5 |
| 100–1000 | 0.19 | 24.7 |
| 1,000–100,000 | 0.16 | 21.8 |
| | 0.77 | |

The product characteristics are as follows:

| | Example II (800° F.) | | | Example III (806° F.) | | | Control IV* (800° F.) | | |
|---|---|---|---|---|---|---|---|---|---|
| Age (bb/#) | S wt % | V + Ni ppm | Ins wt % | S wt % | V + Ni ppm | Ins wt % | S wt % | V + Ni ppm | Ins wt % |
| 0.073 | 0.83 | 27 | 1.13 | 0.71 | 22 | 1.78 | 0.71 | 32 | 1.53 |
| 0.109 | 1.01 | 30 | 1.63 | 0.70 | 26 | 1.89 | 0.85 | 35 | 1.85 |
| 0.201 | 1.13 | 37 | 1.75 | 0.97 | 34 | 2.24 | 1.00 | 43 | 2.13 |
| 0.310 | 1.26 | 42 | 2.12 | 1.09 | 36 | 3.17 | 1.10 | 49 | 2.76 |
| 0.420 | 1.37 | 48 | 2.29 | 1.18 | 40 | 3.61 | 1.19 | 54 | 3.33 |
| 0.493 | 1.44 | 49 | 2.69 | 1.07 | 46 | 4.14 | 1.23 | 58 | 3.73 |
| 0.566 | 1.48 | 52 | 2.82 | 1.22 | 50 | 4.24 | 1.29 | 61 | 3.84 |
| 1000° F+ Conversion: | 53.56 wt % | | | 59.83 wt % | | | 53.49 wt % | | |

From the above table, it will be apparent that at any given age, the trimodal catalyst of this invention gives lower total metals and insolubles in the total liquid product. Furthermore, it can be seen that the trimodal catalyst can be operated at higher severity while maintaining an insoluble content in the liquid product nearly equivalent to the control catalyst (at the lower temperature). In addition to decreasing the heteroatom content of the liquids, operating at the higher temperature yields a product substantially higher in distillable liquids (59.83% vs 53.49%).

For example, after operation for 0.566 barrels per pound, the product of Experimental Example III had a content of metals which was only 50 ppm as compared with 61 ppm for control Example IV*. The sulfur content was only 1.22% as compared to 1.29 in control Example IV*. From Example II, it may be seen that the sulfur content may be lowered to 1.22%—that of control Example IV* being 1.29%.

Although this invention has been illustrated by reference to specific embodiments, it will be apparent to those skilled in the art that various charges and modifications may be made which clearly fall within the scope of the invention.

I claim:

1. A method which comprises mixing at least two finely divided charge aluminas each of which is characterized by at least one Pore Mode in at least one of the ranges (i) 100,000A–10,000A, (ii) 10,000A–1,000A, or (iii) 1000A–30A the mixture containing a Pore Mode in each of the ranges;
   adding to said mixture acidifying liquid in amount of about 90%–110% of the Total Pore Volume of the mixture;
   extruding said acidified mixture;
   drying said extruded mixture; and
   calcining said dried mixture.

2. The method claimed in claim 1 wherein the charge aluminas include:
   (i) a monomodal alumina having a Pore Mode of about 100,000A–10,000A;

(ii) a monomodal alumina having a Pore Mode of about 10,000A-1,000A;

(iii) A monomodal alumina having a Pore Mode of 1,000a-30A.

3. The method claimed in claim 1 wherein the charge aluminas include:
   (i) a monomodal alumina characterized by an Acid Dispersability of less than about 15% and Second Macropores having a Pore Diameter of about 10,000A-1,000A; and
   (ii) a bimodal alumina characterized by Mesopores of Pore Diameter of about 1000A-30A and First Macropores having a Pore Diameter of about 100,000A-10,000A.

4. The method claimed in claim 1 wherein the charge aluminas include
   (i) a monomodal alumina characterized by Acid Dispersability of less than about 15% and First Macropores having a Pore Diameter of about 100,000A-10,000A; and
   (ii) a bimodal alumina characterized by Mesopores of Pore Diameter of about 1000A-30A and Second Macropores having a Pore Diameter of about 10,000A-1000A.

5. The method claimed in claim 1 wherein the charge aluminas include
   (i) a bimodal alumina characterized by Mesopores of Pore Diameter of about 1000A-30A and First Macropores having a Pore Diameter of about 100,00A-10,000A; and
   (ii) a bimodal alumina characterized by Mesopores of Pore Diameter of about 1000A-30A and Second Macropores having a Pore Diameter of about 10,000A-1000A.

* * * * *